March 18, 1952   C. F. DENNESEN   2,589,679
STEERING MECHANISM FOR THE FRONT WHEELS OF BABY CARRIAGES
Filed Sept. 1, 1950

C. F. Dennesen
INVENTOR

BY *Chenow & Co.*
ATTORNEYS.

Patented Mar. 18, 1952

2,589,679

UNITED STATES PATENT OFFICE 2,589,679

STEERING MECHANISM FOR THE FRONT WHEELS OF BABY CARRIAGES

Christian F. Dennesen, Marblehead, Mass.

Application September 1, 1950, Serial No. 182,808

2 Claims. (Cl. 280—48)

This invention relates to a front wheel steering mechanism for baby carriages, strollers or the like, whereby lateral pressure directed to the handles of the stroller or baby carriage in guiding the stroller or baby carriage, will result in the front wheels automatically turning to facilitate the guiding and handling of the vehicle, equipped with the present invention.

Another object of the invention is to provide means for stabilizing the front wheels of a baby carriage or stroller to maintain the front wheels in a straight line, preventing shimmying of the front wheels when the vehicle is passing over irregular ground surfaces, thereby contributing to the ease in handling the stroller or baby carriage.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing

Figure 1:
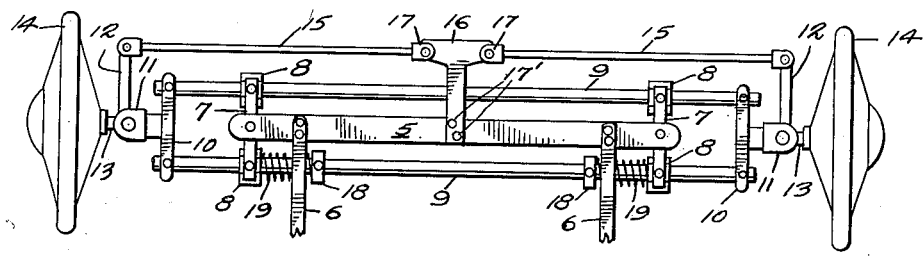
Figure 1 is a plan view of the front wheel assembly illustrating the position of the mechanism when the wheels are moving forwardly in a straight line.

Referring to the drawing in detail, the reference character 5 indicates a front axle bar to which the springs 6 of the vehicle are attached. This bar 5 has its ends connected to the bars 7 arranged at each end of the assembly, the bars 7 being connected to the bearings 8, which bearings move over the stationary auxiliary axles 9 which are arranged in horizontal parallel spaced relation with respect to each other, as clearly shown by the drawing.

The ends of the stationary auxiliary axles 9 are connected by means of the bars 10 that are bolted to the axles. These bars 10 provide supports for the toggle forks 11 which extend therefrom. These forks 11 provide supports for the steering arms 12 which have axles 13 on which the wheels 14 operate.

The steering arms 12 extend rearwardly and connect with the tie rods 15 with which they are associated, the inner ends of the tie rods being connected with the arm 16, at 17. This arm 16 is substantially T-shaped, as clearly shown by Figs. 1 and 2 of the drawing, the arm 16 extending to a point overlying the front axle 5, where it is rigidly secured thereto by means of bolts 17'.

Figure 2:
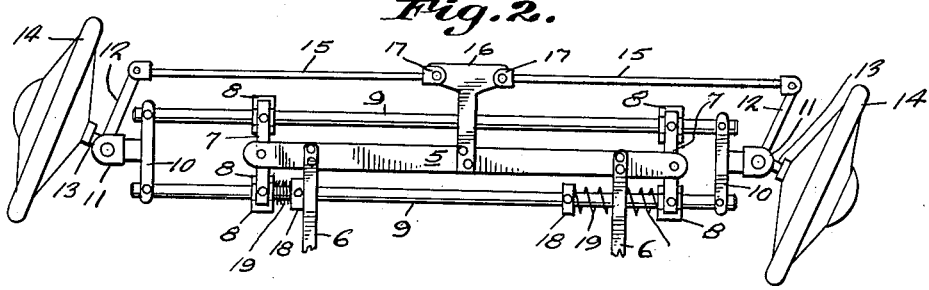
Fig. 2 is a plan view of the assembly, illustrating the position of the various elements, when the wheels have been slightly turned.
Figure 3:
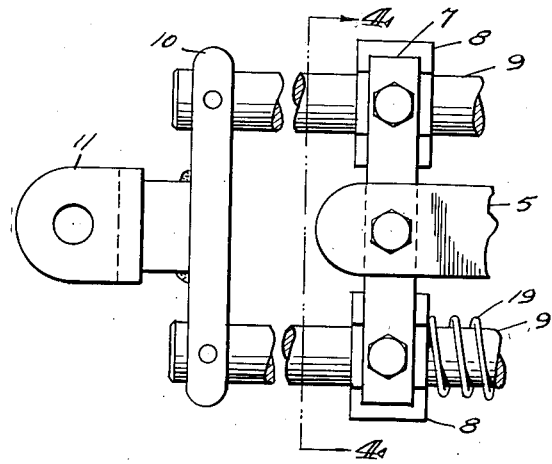
Fig. 3 is an enlarged elevational view of one end of the assembly, with the wheel removed.
Figure 4:
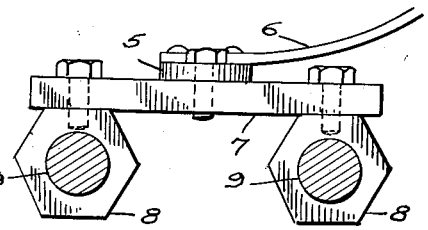
Fig. 4 is a sectional view taken on line 4—4 of Fig. 3.

Secured to the forward stationary axle 9 are adjustable spring stops 18 against which the coiled springs 19 engage, the springs 19 also engaging the bearings 8 that move over the forward stationary axle 9. Thus it will be seen that due to this construction, when the front axle bar 5 is moved to the right or left, due to pressure being directed to the handles of the vehicle, in guiding the vehicle, the bearings 8 will be moved longitudinally of the axle 9 on which they are mounted, the springs 19 acting to stabilize the movements of the bearings and bars 7 connected thereto. It will also be seen that with this movement, the wheels 14 will be moved to the angular position as shown by Fig. 2 of the drawing. The spring 19 at one end of the axle 9 will be compressed thereby biasing the spring. It will be obvious that if the vehicle, or the front end of the vehicle is elevated, as when lifting the front wheels over a curb, the action of the compressed spring 19 will be to move the bars 7 to their normal positions as shown by Fig. 1 of the drawing. With this movement, the wheels 14 will assume the parallel position as shown by Fig. 1 of the drawing.

From the foregoing it will be seen that due to the construction shown and described, I have provided a stabilizing means for use in connection with the front wheels of baby carriages or strollers, which will cause the front wheels of a stroller or baby carriage to take an angular position in guiding the stroller or baby carriage to facilitate maneuvering the stroller or baby carriage.

It will also be seen that due to the yieldable construction, the front wheels of the stroller or baby carriage will be stabilized holding the front wheels in parallel spaced relation with each other under normal conditions.

Having thus described the invention, what is claimed is:

1. In a front wheel steering assembly for vehicles, a front axle bar to which the springs of a vehicle are attached, a pair of parallel auxiliary stationary axles, steering arms pivotally mounted at the ends of the parallel axles on which wheels are mounted, bars slidably mounted on the parallel axles, the ends of the front axle bar being connected to said slidable bars, an attaching bar connected with the front axle bar, tie rods connecting the attaching bar and steering arms, and coiled springs mounted on one of said parallel axles engaging said slidable bars, tensioning the movements of the steering assembly.

2. In a front wheel steering assembly for vehicles, a pair of parallel spaced stationary axles, steering arms supported at the ends of the axles, tie rods connected to the steering arms, an attaching arm to which said tie rods are connected, a front axle bar to which the attaching arm is connected at a point intermediate the ends of the axle bar, bearings mounted on the stationary axles for movement longitudinally thereof, bars connecting the bearing members to which the ends of the front axle bar are connected, stops adjustably mounted on one of said stationary axles, coiled springs disposed between the stops and bearings operating over one of said stationary axles, whereby lateral movement of the front axle bar moves said tie rods and steering arms, and wheels mounted on said assembly, operated by said steering arms, steering the vehicle to which the assembly is connected.

CHRISTIAN F. DENNESEN.

REFERENCES CITED

The following references are of record in the file of this patent:

UNITED STATES PATENTS

| Number | Name | Date |
|---|---|---|
| 1,457,975 | Hoffman | June 5, 1923 |
| 1,486,612 | Stokes | Mar. 11, 1924 |
| 2,030,822 | Lundelius et al. | Feb. 11, 1936 |
| 2,330,557 | Collis | Sept. 28, 1943 |
| 2,482,230 | Welsh | Sept. 20, 1949 |